(12) United States Patent
Pack et al.

(10) Patent No.: US 9,719,363 B2
(45) Date of Patent: Aug. 1, 2017

(54) SEGMENTED RIM SEAL SPACER FOR A GAS TURBINE ENGINE

(71) Applicant: UNITED TECHNOLOGIES CORPORATION, Hartford, CT (US)

(72) Inventors: David R Pack, Gilbert, AZ (US); Julian Partyka, West Springfield, MA (US); James D. Hill, Tolland, CT (US); Gabriel L Suciu, Glastonbury, CT (US); Gregory M Dolansky, Higganum, CT (US); Brian D Merry, Andover, CT (US)

(73) Assignee: United Technologies Corporation, Farmington, CT (US)

(*) Notice: Subject to any disclaimer, the term of this patent is extended or adjusted under 35 U.S.C. 154(b) by 111 days.

(21) Appl. No.: 14/730,400

(22) Filed: Jun. 4, 2015

(65) Prior Publication Data

US 2015/0354389 A1 Dec. 10, 2015

Related U.S. Application Data

(60) Provisional application No. 62/008,563, filed on Jun. 6, 2014.

(51) Int. Cl.
*F01D 5/06* (2006.01)
*F01D 11/00* (2006.01)

(52) U.S. Cl.
CPC .............. *F01D 11/008* (2013.01); *F01D 5/06* (2013.01); *F01D 11/001* (2013.01); *F01D 11/005* (2013.01); *F05D 2220/32* (2013.01); *F05D 2240/55* (2013.01); *Y02T 50/671* (2013.01)

(58) Field of Classification Search
None
See application file for complete search history.

(56) References Cited

U.S. PATENT DOCUMENTS

| | | | |
|---|---|---|---|
| 4,470,757 A | 9/1984 | Vollinger | |
| 4,884,950 A * | 12/1989 | Brodell | F01D 5/081 415/173.7 |
| 5,226,785 A | 7/1993 | Narayana et al. | |
| 5,232,335 A | 8/1993 | Narayana et al. | |
| 5,338,154 A * | 8/1994 | Meade | F01D 11/001 403/371 |
| 5,630,703 A | 5/1997 | Hendley et al. | |
| 5,833,244 A * | 11/1998 | Salt | F01D 11/001 277/418 |
| 6,382,903 B1 | 5/2002 | Caruso et al. | |
| 6,428,270 B1 | 8/2002 | Leone et al. | |
| 6,464,453 B2 * | 10/2002 | Toborg | F01D 5/081 415/115 |
| 7,309,210 B2 | 12/2007 | Suciu et al. | |

(Continued)

FOREIGN PATENT DOCUMENTS

SU 693040 A1 10/1979

*Primary Examiner* — Dwayne J White
*Assistant Examiner* — Theodore Ribadeneyra
(74) *Attorney, Agent, or Firm* — Bachman & LaPointe, P.C.

(57) ABSTRACT

A seal segment for a gas turbine engine includes a first axial span that extends between the first radial span and the second radial span. A second axial span extends between the first radial span and the second radial span, the first radial span, the second radial span, the first axial span and the second axial span forming a torque box.

14 Claims, 7 Drawing Sheets

(56) References Cited

U.S. PATENT DOCUMENTS

| | | | |
|---|---|---|---|
| 7,331,763 B2 | 2/2008 | Higgins et al. | |
| 8,177,495 B2 * | 5/2012 | Bowes | F01D 11/001 |
| | | | 415/174.2 |
| 8,348,603 B2 | 1/2013 | Garcia-Crespo et al. | |
| 8,388,309 B2 | 3/2013 | Marra et al. | |
| 9,097,129 B2 * | 8/2015 | Aiello | F01D 11/001 |
| 2010/0074732 A1 * | 3/2010 | Marra | F01D 5/025 |
| | | | 415/173.4 |
| 2011/0081235 A1 * | 4/2011 | Shah | F01D 5/16 |
| | | | 415/170.1 |
| 2012/0051917 A1 * | 3/2012 | Wines | F01D 5/066 |
| | | | 416/179 |
| 2014/0154059 A1 | 6/2014 | Jewess | |

* cited by examiner

SEGMENTED RIM SEAL SPACER FOR A GAS TURBINE ENGINE

CROSS REFERENCE TO RELATED APPLICATION

This application claims the benefit of provisional application Ser. No. 62/008,563, filed Jun. 6, 2014.

BACKGROUND

The present disclosure relates to a gas turbine engine and, more particularly, to an interstage seal therefore.

Gas turbine engines with multiple turbine stages include interstage seal arrangements between adjacent stages for improved operating efficiency. The interstage seal arrangements confine the flow of hot combustion core gases within an annular path around and between stationary turbine stator blades, nozzles and also around and between adjacent rotor blades.

The interstage seal arrangements may also serve to confine and direct cooling air to cool the turbine disks, the turbine blade roots, and also the interior of the rotor blades themselves as rotor blade cooling facilities higher turbine inlet temperatures, which results in higher thermal efficiency of the engine and higher thrust output. The interstage seal configurations must also accommodate axial and radial movements of the turbine stage elements during engine operation as the several elements are subjected to a range of different loadings and different rates of expansion based upon local part temperatures and aircraft operating conditions.

One such interstage seal includes a monolithic interstage seal structure that spans the axial gap between the rotor disks. Although effective, the monolithic interstage seal is typically manufactured from high strength materials to withstand the relatively high hoop stresses induced by rotation. This may result in a relatively heavy seal structure that imposes additional weight adjacent the rotor disks. Another interstage seal is a segmented seal assembly in which multiple segments are assembled together circumferentially. Although effective, the multiple segments may increase transient load variation between the rotor disks and may result in additional leakage paths between the segments.

SUMMARY

A seal segment for a gas turbine engine according to one disclosed non-limiting embodiment of the present disclosure includes a first axial span that extends between said first radial span and said second radial span; and a second axial span that extends between said first radial span and said second radial span, said first radial span, said second radial span, said first axial span, and said second axial span form a torque box.

A further embodiment of the present disclosure includes, wherein said second radial span is generally parallel to said first radial span.

A further embodiment of any of the foregoing embodiments of the present disclosure includes, a seal span that extends between said first radial span and said second radial span, said seal span including a multiple of knife edge seals.

A further embodiment of any of the foregoing embodiments of the present disclosure includes, wherein said seal span includes at least one aperture.

A further embodiment of any of the foregoing embodiments of the present disclosure includes, wherein said second radial span includes at least one aperture.

A further embodiment of any of the foregoing embodiments of the present disclosure includes, an internal beam between said first radial span and said second radial span.

A further embodiment of any of the foregoing embodiments of the present disclosure includes, wherein said internal beam is arranged between said first axial span and said second axial span.

A further embodiment of any of the foregoing embodiments of the present disclosure includes, wherein said internal beam includes at least one aperture.

A further embodiment of any of the foregoing embodiments of the present disclosure includes, a first and second flow discourager that respectively extends from said first radial span and said second radial span.

A further embodiment of any of the foregoing embodiments of the present disclosure includes, a first and second axial support that respectively extend from said first radial span and said second radial span.

A further embodiment of any of the foregoing embodiments of the present disclosure includes, a groove within said first and second axial support, said groove operable to receive a wire seal.

A section within a gas turbine engine according to another disclosed non-limiting embodiment of the present disclosure includes a first rotor disk mounted along a longitudinal engine axis; a second rotor disk along said longitudinal engine axis; and a segmented interstage seal assembly axially between said first rotor disk and said second rotor disk, said segmented interstage seal assembly including a multiple of seal segments, each of said multiple of seal segments form a torque box.

A further embodiment of any of the foregoing embodiments of the present disclosure includes, wherein each of said multiple of seal segments are circumferentially engaged with an adjacent seal segment.

A further embodiment of any of the foregoing embodiments of the present disclosure includes, a shiplap interface between each of said multiple of seal segments.

A further embodiment of any of the foregoing embodiments of the present disclosure includes, wherein said segmented interstage seal assembly is operable to direct secondary cooling air from a full ring shroud assembly toward said second rotor disk.

A further embodiment of any of the foregoing embodiments of the present disclosure includes, a first and second flow discourager that extends from each of said multiple of seal segments to seal with said respective first rotor disk and second rotor disk.

A further embodiment of any of the foregoing embodiments of the present disclosure includes, wherein each of said multiple of seal segments a multiple of knife edge seals.

A further embodiment of any of the foregoing embodiments of the present disclosure includes, an internal beam within said torque box of each of said multiple of seal segments.

A further embodiment of any of the foregoing embodiments of the present disclosure includes, wherein said segmented interstage seal assembly is supported on a pilot diameter of said first rotor disk and said second rotor disk.

A further embodiment of any of the foregoing embodiments of the present disclosure includes, an anti-rotation tab that extends from at least one of said multiple of seal segments, said anti-rotation tab interfaces with a stop on at least one of said first rotor disk and said second rotor disk.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
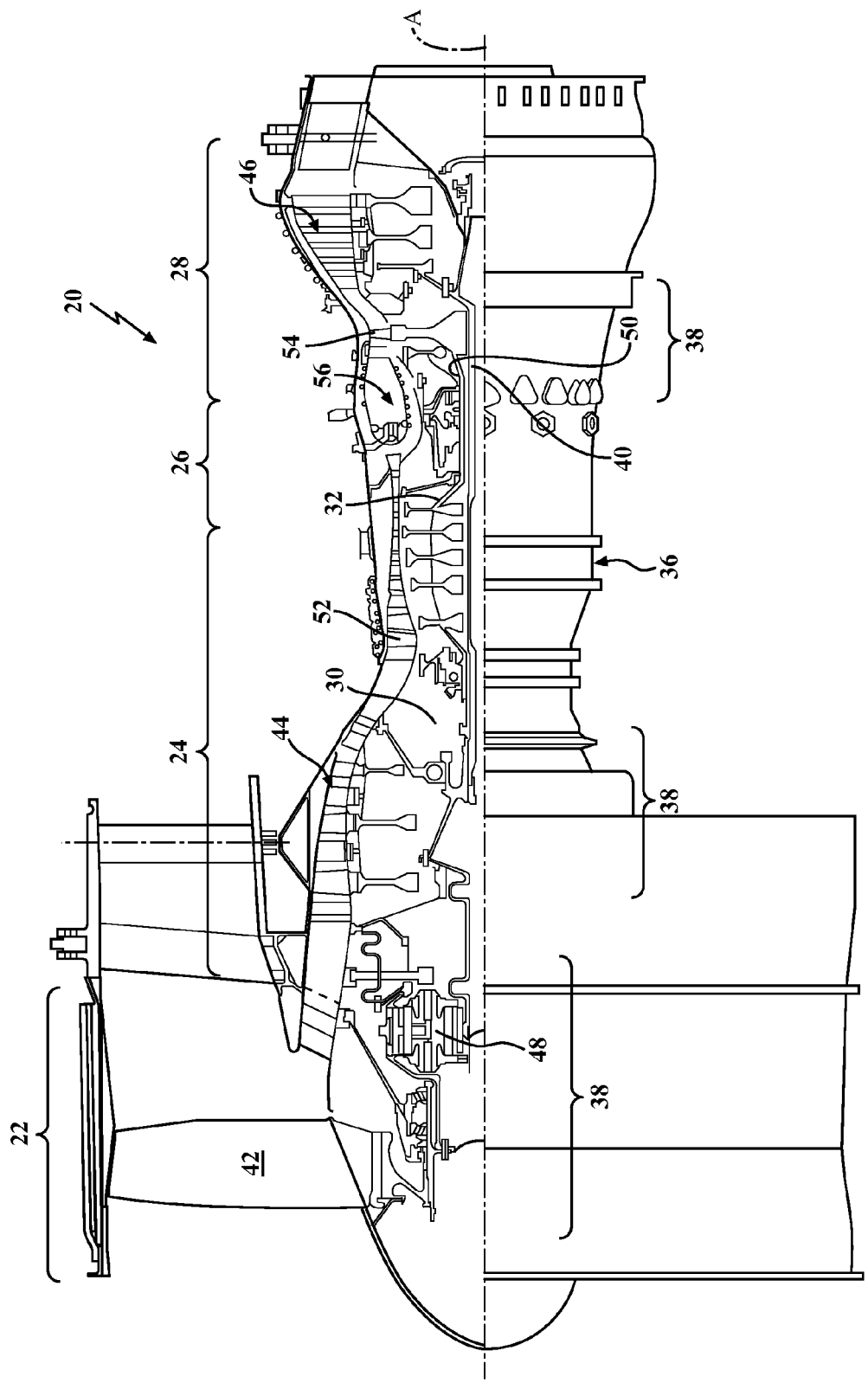
FIG. 1 is a schematic cross-section of an example gas turbine engine architecture.
Figure 2:
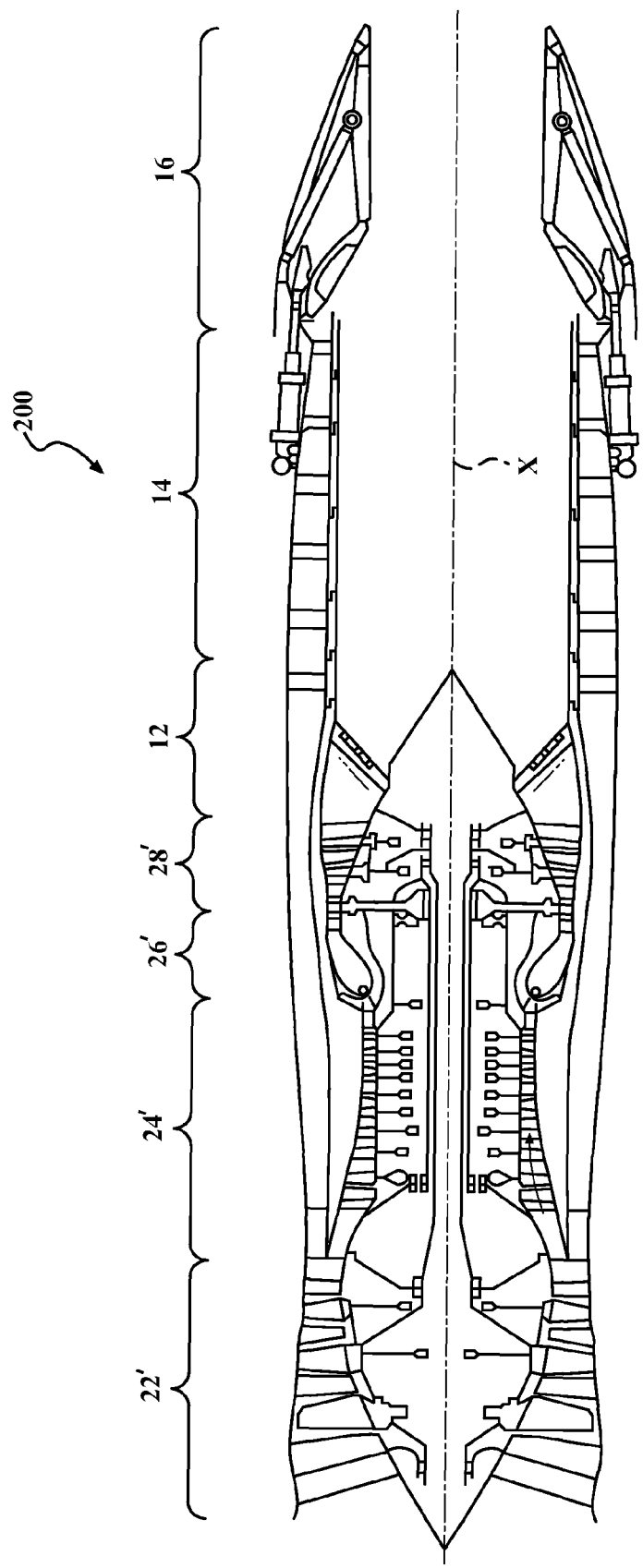
FIG. 2 is a schematic cross-section of another example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engine architectures 200 might include an augmentor section 12, an exhaust duct section 14, and a nozzle section 16 (FIG. 2) among other systems or features. The fan section 22 drives air along a bypass flowpath while the compressor section 24 drives air along a core flowpath for compression and communication into the combustor section 26, then expansion through the turbine section 28. Although depicted as a turbofan in the disclosed non-limiting embodiment, it should be understood that the concepts described herein are not limited to use with turbofans and may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor ("LPC") 44, and a low pressure turbine ("LPT") 46. The inner shaft 40 drives the fan 42 directly, or through a geared architecture 48, to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A.

Core airflow is compressed by the LPC 44, then the HPC 52, mixed with fuel and burned in the combustor 56, then expanded over the HPT 54 and the LPT 46. The HPT and LPT 54, 46 rotationally drive the respective low spool 30 and high spool 32 in response to the expansion.

Figure 3:
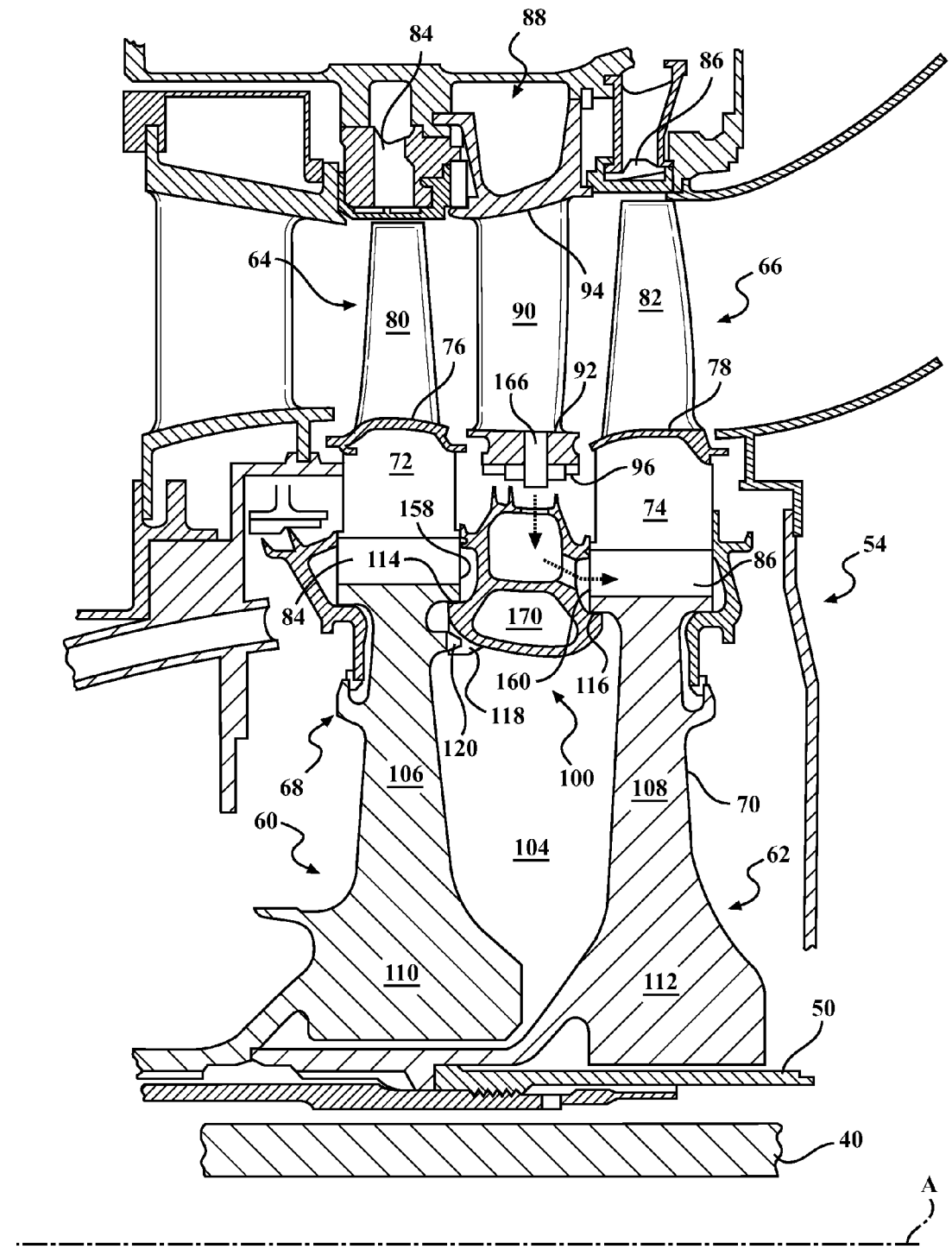
FIG. 3 is an enlarged schematic cross-section of an engine high pressure turbine section.

With reference to FIG. 3, an enlarged schematic view of the HPT 54 is shown by way of example; however, other engine sections will also benefit herefrom. The HPT 54 includes a two-stage turbine section with a first rotor assembly 60 and a second rotor assembly 62, both of which are affixed to the outer shaft 50.

The rotor assemblies 60, 62 include a respective array of blades 64, 66 circumferentially disposed around a disk 68, 70. Each blade 64, 66 includes a respective root 72, 74, a platform 76, 78 and an airfoil 80, 82. Each blade root 72, 74 is received within a respective rim 84, 86 of the disk 68, 70 and the airfoils 80, 82 extend radially outward toward a blade outer air seal (BOAS) assembly 81, 83.

The blades 64, 66 are disposed in the core flowpath that is pressurized in the compressor section 24 then heated to a working temperature in the combustor section 26. The platforms 76, 78 separate a gas path side inclusive of the airfoil 80, 82 and a non-gas path side inclusive of the root 72, 74.

A shroud assembly 88 within the engine case structure 36 between the blade stages 26, 28 directs the hot gas core airflow in the core flowpath from the first stage blades 64 to the second stage blades 66. The shroud assembly 88 may at least partially support the BOAS assemblies 81, 83 and includes an array of vanes 90 that extend between a respective inner vane platform 92 and an outer vane platform 94. The outer vane platforms 94 may be supported by the engine case structure 36 and the inner vane platforms 92 support an abradable annular seal 96 to seal the hot gas core airflow in the axial direction with respect to a segmented interstage seal assembly 100.

Figure 4:
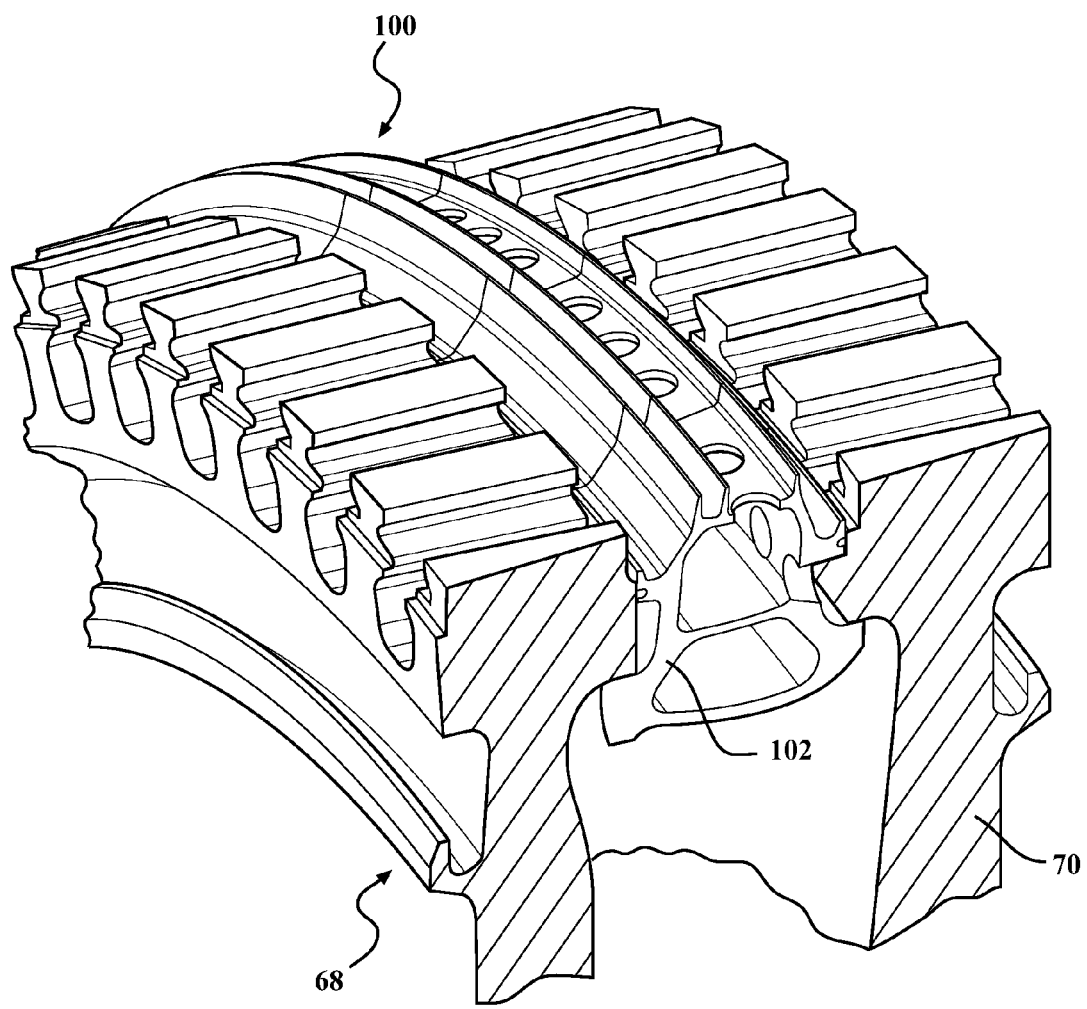
FIG. 4 is a perspective partial sectional view of high pressure turbine rotor assembly with a segmented interstage seal assembly.

The segmented interstage seal assembly 100 includes a plurality of individual seal segments 102 (FIG. 4) disposed between the first and second rotor assemblies 60, 62 for sealing between the axially flowing hot gas core airflow and a radially inner volume 104 between a respective web 106, 108 and hub 110, 112 of the disks 68, 70. The multiple of seal segments 102 thereby eliminate hoop stress in the segmented interstage seal assembly 100. Each seal segment 102 may be cast of an airfoil material such as a single crystal nickel superalloy to provide increased knife edge temperature capability. Such materials facilitate reduced transient load variation into the rim 84, 86 by minimization, if not elimination, of the thermally induced growth relative to the disks 68, 70.

Each seal segment 102 is radially supported on a respective pilot diameter 114, 116 formed by the respective rim 84, 86 of the disk 68, 70. At least one of the individual seal segments 102 includes an anti-rotation tab 118 that interfaces with a stop 120 on the rim 84 of the disk 68. It should be appreciated that various interfaces may be alternatively or additionally provided on one, or multiple, seal segments 102.

Figure 5:
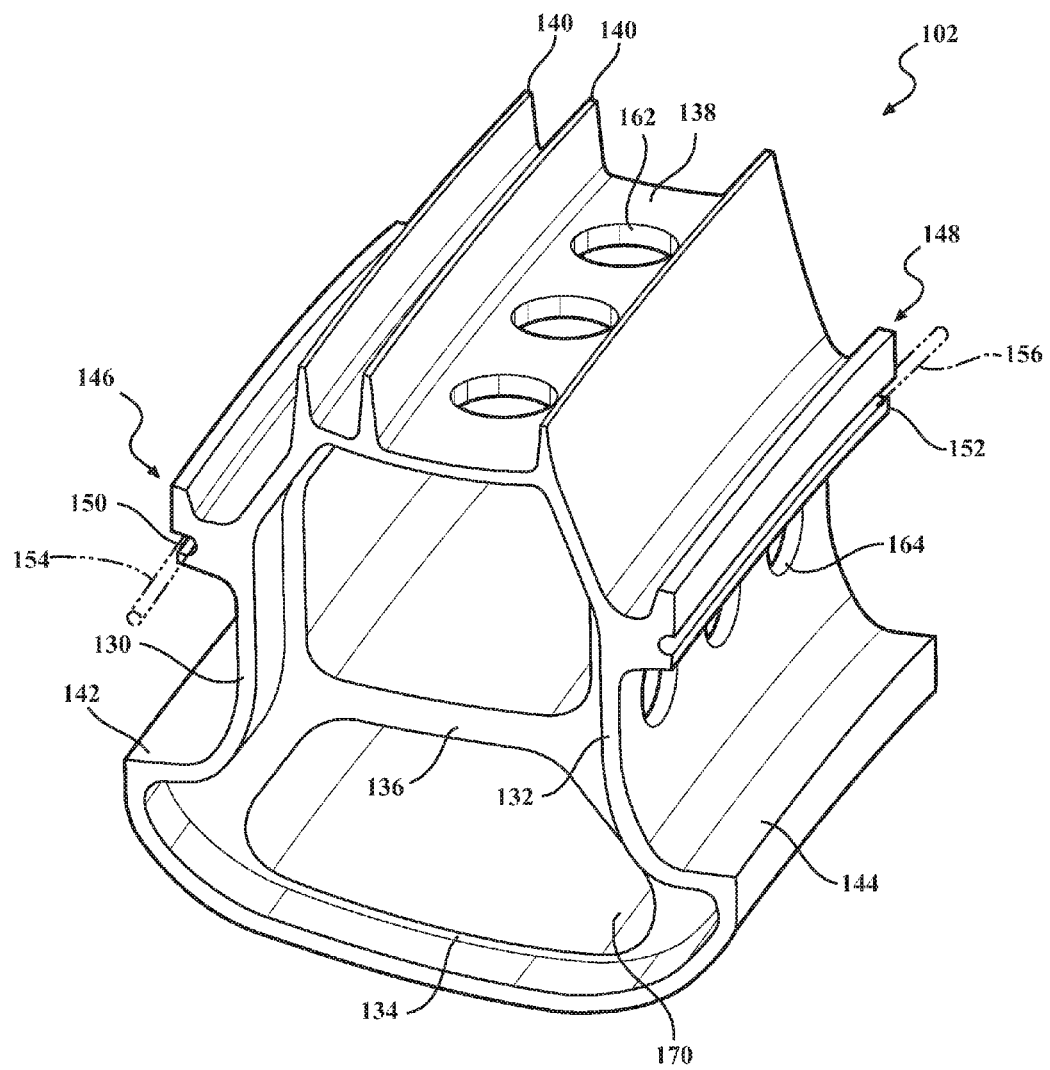
FIG. 5 is a perspective view of a seal segment of the segmented interstage seal assembly according to one disclosed non-limiting embodiment from a first circumferential side.
Figure 6:
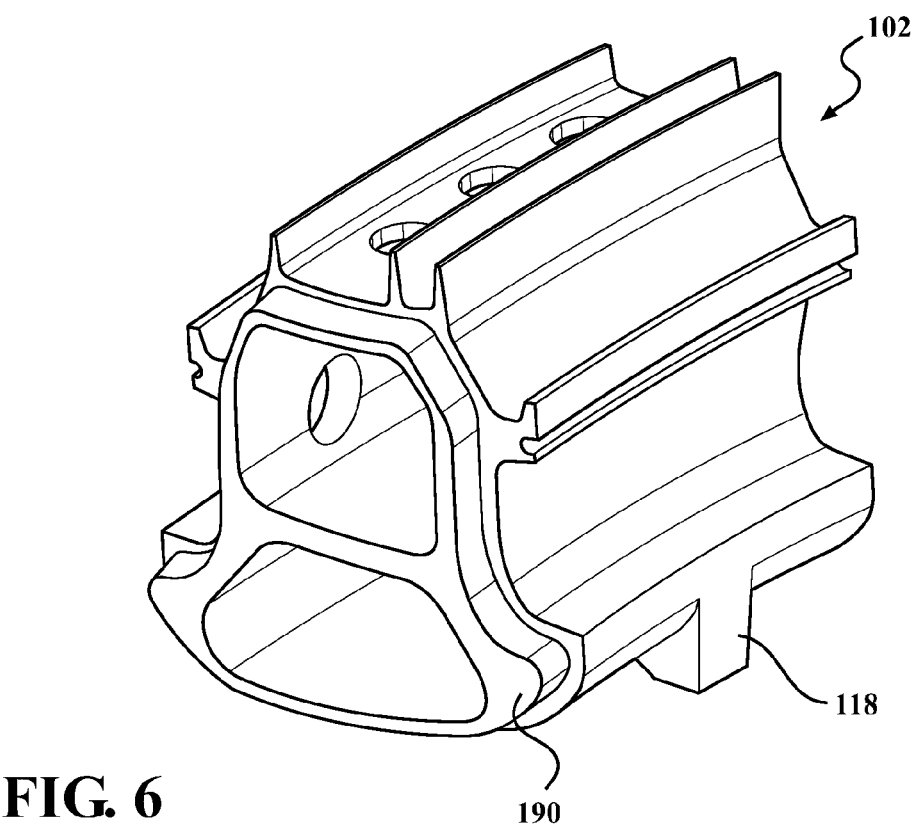
FIG. 6 is a perspective view of the seal segment of FIG. 5 from a second circumferential side.

With reference to FIGS. 5 and 6, each seal segment 102 generally includes a first radial span 130, a second radial span 132, a first axial span 134, a second axial span 136, and a seal span 138 with a multiple of knife edge 140 that engage the abradable annular seal 96 (FIG. 3). The first axial span 134, the second axial span 136, and the seal span 138 extend generally axially between the first radial span 130 and the second radial span 132 which extend generally radially with respect to the engine axis A. It should be appreciated that the first axial span 134, the second axial span 136, and the seal span 138 may include a generally arcuate configuration to facilitate resistance to interstage loads from the first and second rotor assemblies 60, 62

The first radial span 130 and the second radial span 132 include a respective radial support 142, 144 that engage the respective pilot diameter 114, 116. The first radial span 130 and the second radial span 132 also include a respective axial supports 146, 148 that maintain axial spacing of the segmented interstage seal assembly 100. The axial supports 146, 148 include a circumferential groove 150, 152 to support wire seals 154, 156 that seal with a radial face 158, 160 of the associated disks 68, 70 (FIG. 3).

The seal span 138 and the second radial span 132 includes a multiple of apertures 162, 164 that receive and direct a cooling flow from a passage 166 through the vanes 90 into the second stage disk 70. The multiple of apertures 164 in the second radial span 132 thereby operate essentially as a tangential onboard injector (TOBI).

Figure 7:
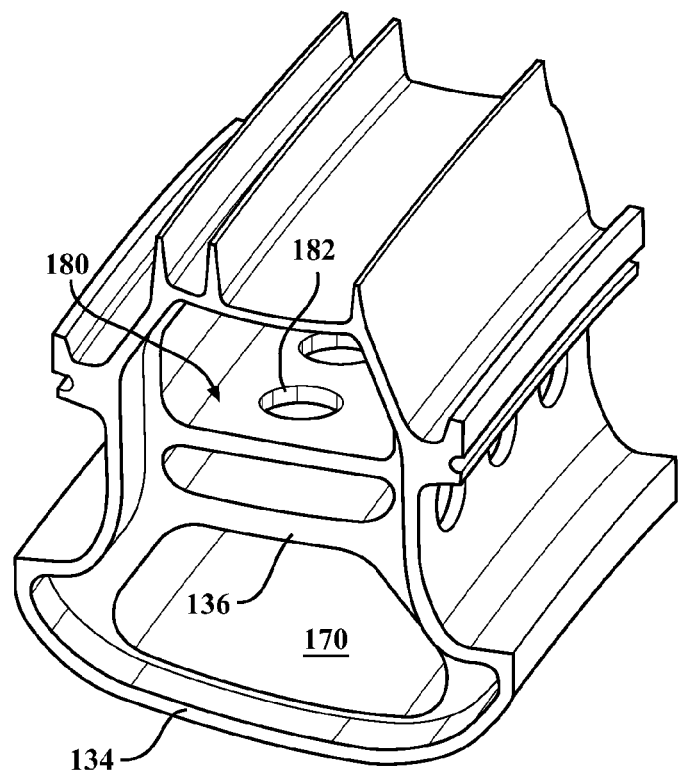
FIG. 7 is a perspective view of a seal segment of the segmented interstage seal assembly according to another disclosed non-limiting embodiment.

The first radial span 130, the second radial span 132, the first axial span 134, and the second axial span 136 form a torque box 170 to minimize bending and resist a crushing load between the first and second rotor assemblies 60, 62. In other words, shear loads are transferred to all of the sides to improve structural efficiency. The torque box 170 stiffens each seal segment 102 against axial deflection and maintains the disks 68, 70 at a uniform axial displacement. In an alternate embodiment, an internal beam 180 with apertures 182 (FIG. 7) may be located between the axial supports 146, 148 to further strengthen the torque box 170.

Each seal segment 102 includes a shiplap interface 190 (FIG. 6) such that each seal segment 102 may be assembled at least partially into an adjacent seal segment 102 to form the segmented interstage seal assembly 100. That is, the segmented interstage seal assembly 100 is a ring of seal segments 102 and the shiplap interface 190 reduces air leakage gaps between seal segments 102.

Figure 8:
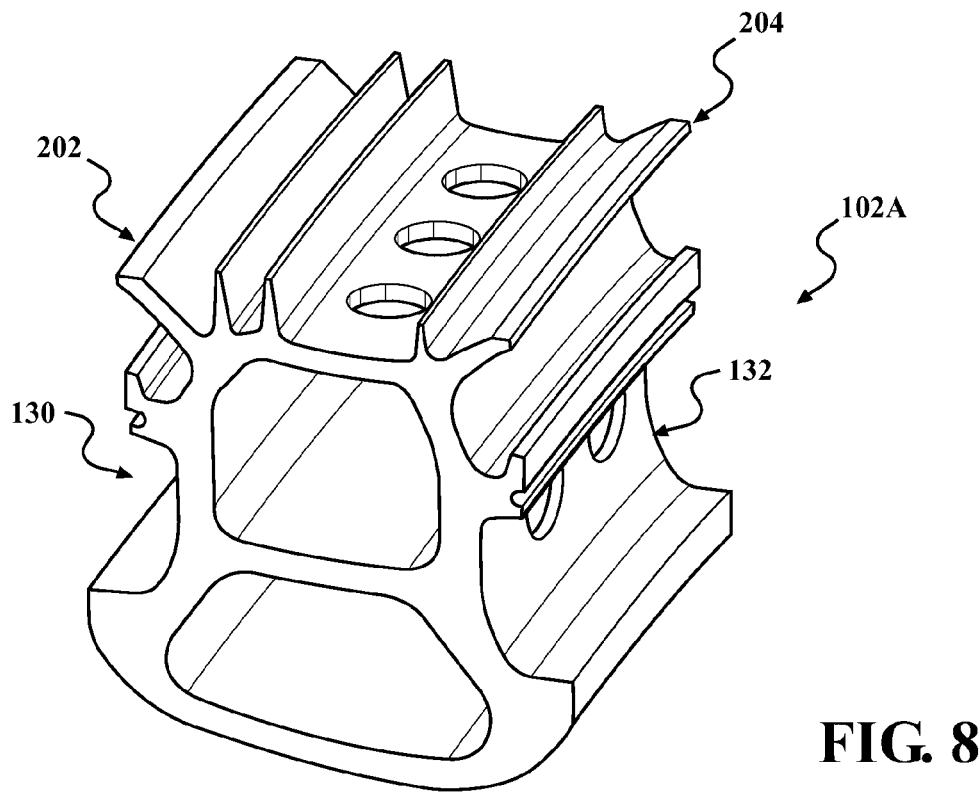
FIG. 8 is a perspective view of a seal segment of the segmented interstage seal assembly according to one disclosed non-limiting embodiment from a first circumferential side.
Figure 9:
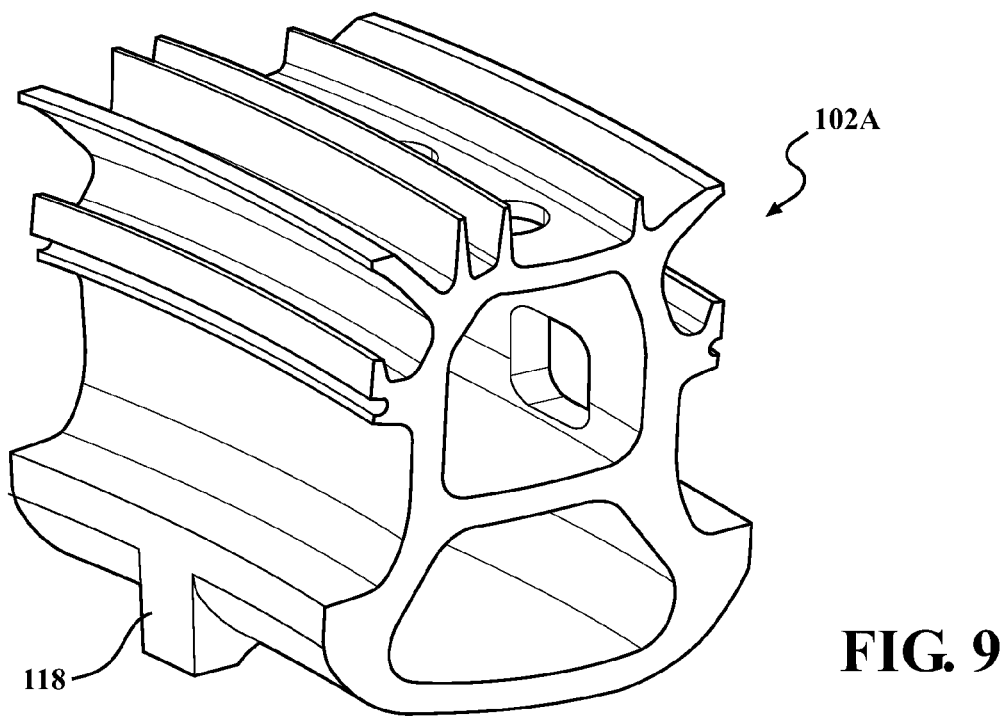
FIG. 9 is a perspective view of the seal segment of FIG. 8 from a second circumferential side.

With reference to FIGS. 8 and 9, in another disclosed non-limiting embodiment, each individual seal segment 102A includes a first and second flow discourager 202, 204 that extends from the respective first and second radial span 130, 132. The first and second flow discouragers 202, 204 extend generally axially from the seal segment 102A to interface with the radial face 158, 160 of the disks 68, 70 (FIG. 3) to further minimize core gas flow ingestion.

The segmented interstage seal assembly 100 provides a lightweight interstage seal operable to accommodate differential thermal growth between the adjacent disks 68, 70, is operable to withstand rotation induced forces, and is dimensionally stable in the radial direction to avoid excessive radial movement of the rotating knife edges 140.

The segmented interstage seal assembly 100 beneficially reduces knife edge 140 stress by segmenting the seal into segments 102, eliminates a bore and reduces engine length and weight by integration of a TOBI. The segmented interstage seal assembly 100 also operates as a seal to isolate core gas flow from the rotor disks and facilitates a reduction of the disk bore width through increase in bore height to eliminate a coupling shaft and provide for a relatively shorter engine.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A seal segment for a gas turbine engine, comprising:
   a first radial span;
   a second radial span;
   a first axial span that extends between said first radial span and said second radial span;
   a second axial span that extends between said first radial span and said second radial span, said first radial span, said second radial span, said first axial span, and said second axial span form a torque box;
   a seal span that extends between said first radial span and said second radial span, said seal span including a multiple of knife edge seals, said seal span includes at least one aperture.

2. The seal segment as recited in claim 1, wherein said second radial span is generally parallel to said first radial span.

3. The seal segment as recited in claim 1, wherein said second radial span includes at least one aperture.

4. The seal segment as recited in claim 1, further comprising a first and second flow discourager that respectively extends from said first radial span and said second radial span.

5. A seal segment for a gas turbine engine, comprising:
a first radial span;
a second radial span;
a first axial span that extends between said first radial span and said second radial span;
a second axial span that extends between said first radial span and said second radial span, said first radial span, said second radial span, said first axial span, and said second axial span form a torque box; and
an internal beam between said first radial span and said second radial span, said internal beam is arranged between said first axial span and said second axial span, said internal beam includes at least one aperture.

6. A seal segment for a gas turbine engine, comprising:
a first radial span;
a second radial span;
a first axial span that extends between said first radial span and said second radial span;
a second axial span that extends between said first radial span and said second radial span, said first radial span, said second radial span, said first axial span, and said second axial span form a torque box; and
a first and second axial support that respectively extend from said first radial span and said second radial span, a groove within said first and second axial support, said groove operable to receive a wire seal.

7. A section within a gas turbine engine, comprising:
a first rotor disk mounted along a longitudinal engine axis;
a second rotor disk along said longitudinal engine axis; and
a segmented interstage seal assembly axially between said first rotor disk and said second rotor disk, said segmented interstage seal assembly including a multiple of seal segments, each of said multiple of seal segments form a torque box, said segmented interstage seal assembly is operable to direct secondary cooling air from a full ring shroud assembly toward said second rotor disk.

8. The section as recited in claim 7, wherein each of said multiple of seal segments are circumferentially engaged with an adjacent seal segment.

9. The section as recited in claim 8, further comprising a shiplap interface between each of said multiple of seal segments.

10. The section as recited in claim 7, further comprising a first and second flow discourager that extends from each of said multiple of seal segments to seal with said respective first rotor disk and second rotor disk.

11. The section as recited in claim 7, wherein each of said multiple of seal segments includes a multiple of knife edge seals.

12. The section as recited in claim 7, further comprising an internal beam within said torque box of each of said multiple of seal segments.

13. The section as recited in claim 7, wherein said segmented interstage seal assembly is supported on a pilot diameter of said first rotor disk and said second rotor disk.

14. The section as recited in claim 7, further comprising an anti-rotation tab that extends from at least one of said multiple of seal segments, said anti-rotation tab interfaces with a stop on at least one of said first rotor disk and said second rotor disk.

* * * * *